United States Patent
Glugla et al.

(10) Patent No.: US 9,394,846 B2
(45) Date of Patent: **\*Jul. 19, 2016**

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/485,107

(22) Filed: Sep. 12, 2014

(65) Prior Publication Data
US 2015/0006062 A1    Jan. 1, 2015

Related U.S. Application Data

(63) Continuation of application No. 13/070,720, filed on Mar. 24, 2011, now Pat. No. 8,838,365.

(51) Int. Cl.
| F02D 41/30 | (2006.01) |
| F02D 41/40 | (2006.01) |
| F02M 7/133 | (2006.01) |
| F02D 35/02 | (2006.01) |

(52) U.S. Cl.
CPC ............ *F02D 41/3094* (2013.01); *F02D 41/30* (2013.01); *F02D 41/402* (2013.01); *F02D 35/027* (2013.01); *F02D 35/028* (2013.01); *F02M 7/133* (2013.01); *Y02T 10/44* (2013.01)

(58) Field of Classification Search
CPC ... F02D 41/30; F02D 41/402; F02D 41/3094; F02D 35/027; F02D 35/028; F02M 7/133; Y02T 10/44
See application file for complete search history.

(56) References Cited

U.S. PATENT DOCUMENTS

| 5,386,367 | A  | 1/1995  | Ziegler et al. |
| 6,158,418 | A  | 12/2000 | Brown et al.   |
| 6,354,264 | B1 | 3/2002  | Iwakiri et al. |
| 6,561,163 | B1 | 5/2003  | Takahashi et al. |

(Continued)

FOREIGN PATENT DOCUMENTS

| CN | 2010084739 A | 4/2010 |
| DE | 10354978 A1 | 7/2005 |

(Continued)

OTHER PUBLICATIONS

Partial Translation of Office Action of Chinese Application No. 2011800694977, Issued Aug. 5, 2015, State Intellectual Property Office of PRC, 15 Pages.

(Continued)

*Primary Examiner* — Hieu T Vo
(74) *Attorney, Agent, or Firm* — Julia Voutyras; Alleman Hall MCoy Russell & Tuttle LLP

(57) ABSTRACT

Methods and systems are provided for addressing cylinder pre-ignition. Each cylinder of an engine may be operated in either a split injection mode or a single injection mode based on the pre-ignition history of the cylinder. The timing and number of injections in the split injection mode is adjusted based on the pre-ignition count of the cylinder.

18 Claims, 6 Drawing Sheets

(56) References Cited

U.S. PATENT DOCUMENTS

| | | |
|---|---|---|
| 6,705,277 B1 | 3/2004 | McGee |
| 7,128,048 B2 | 10/2006 | Yamoaka et al. |
| 7,178,503 B1 | 2/2007 | Brehob |
| 8,068,972 B2 | 11/2011 | Auclair et al. |
| 8,095,297 B2 | 1/2012 | Glugla et al. |
| 8,171,912 B2 | 5/2012 | Glugla et al. |
| 8,402,944 B2* | 3/2013 | Lorenz .................. F02D 35/027 123/406.45 |
| 8,439,011 B2 | 5/2013 | Glugla et al. |
| 8,838,365 B2* | 9/2014 | Glugla .................. F02D 41/402 123/305 |
| 2006/0243243 A1 | 11/2006 | Fukasawa |
| 2007/0215107 A1 | 9/2007 | Shelby et al. |
| 2007/0215130 A1 | 9/2007 | Shelby et al. |
| 2010/0094528 A1 | 4/2010 | Auclair et al. |

FOREIGN PATENT DOCUMENTS

| | | |
|---|---|---|
| EP | 0733891 A2 | 9/1996 |
| JP | 102374056 A | 3/2012 |

OTHER PUBLICATIONS

ISA European Patent Office, Search Report of PCT/US2011/059160, Feb. 24, 2012, Netherlands, 5 pages.

ISA European Patent Office, Written Opinion of PCT/US2011/059160, Feb. 24, 2012, Netherlands, 7 pages.

* cited by examiner

METHOD AND SYSTEM FOR PRE-IGNITION CONTROL

CROSS REFERENCE TO RELATED APPLICATIONS

The present application is a continuation of U.S. patent application Ser. No. 13/070,720, "METHOD AND SYSTEM FOR PRE-IGNITION CONTROL," filed on Mar. 24, 2011, the entire contents of which are hereby incorporated by reference for all purposes.

FIELD

The present description relates generally to methods and systems for controlling a vehicle engine in response to pre-ignition detection.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

One example approach for addressing pre-ignition is shown by Brehob in U.S. Pat. No. 7,178,503. Therein, an injection timing of a direct injector is adjusted to reduce pre-ignition. In particular, the injection timing is adjusted so as to center the injection duration roughly at BDC. Alternatively, the injection timing is adjusted to spray the fuel onto the piston (e.g., early in intake stroke or late in compression stroke).

However, the inventors herein have identified potential issues with such an approach. As one example, different cylinders may have differing propensities for pre-ignition. Thus, the same injection timing adjustment may reduce pre-ignition in one cylinder but not another. As another example, even with the adjusted injection timing, pre-ignition may not be sufficiently reduced. Further still, the injection timing adjustment may lead to undesirable torque disturbances between the cylinders.

Thus in one example, at least some of the above issues may be partly addressed by a method of operating an engine comprising, adjusting a timing and number of injections of a fuel injection to an engine cylinder, in a single engine cycle, based on a pre-ignition count of the cylinder.

In one example, an engine control system may compare the pre-ignition counts of each engine cylinder. A first engine cylinder with a higher pre-ignition count may be rich injected while a second cylinder with a lower pre-ignition count may be lean injected. Further, the first cylinder may be operated in a split injection mode such that the rich fuel injection is delivered as multiple injections in the same engine cycle. In comparison, the second cylinder may be operated in a single injection mode such that the lean fuel injection is delivered in a single injection.

The number of injections as well as the timing of each injection to the first cylinder may be based on the pre-ignition count of the first cylinder. Likewise, the timing of the lean fuel injection may be based on the pre-ignition count of the second cylinder. As one example, as the pre-ignition count of the first cylinder increases, the number of injections may be increased. As another example, the injection timing of the multiple injections in the first cylinder may be adjusted to either advance or retard the average injection timing from TDC to place the rich injection timing in a pre-ignition reducing injection timing (or timing range). The injection timing adjustment may depend on the amount of fuel injected in each of the multiple injections (that is, a split ratio of the injections) as well as the pre-ignition count of the first cylinder.

In this way, by adjusting the fueling of each cylinder of an engine based on respective pre-ignition counts, engine pre-ignition may be reduced even if different cylinders of the engine have different likelihoods of pre-ignition. Further, by using a split rich injection in cylinders with a higher propensity for pre-ignition, the pre-ignition mitigating effect of the enrichment may be improved. In this way, engine degradation due to pre-ignition can be reduced while improving engine fuel economy and exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
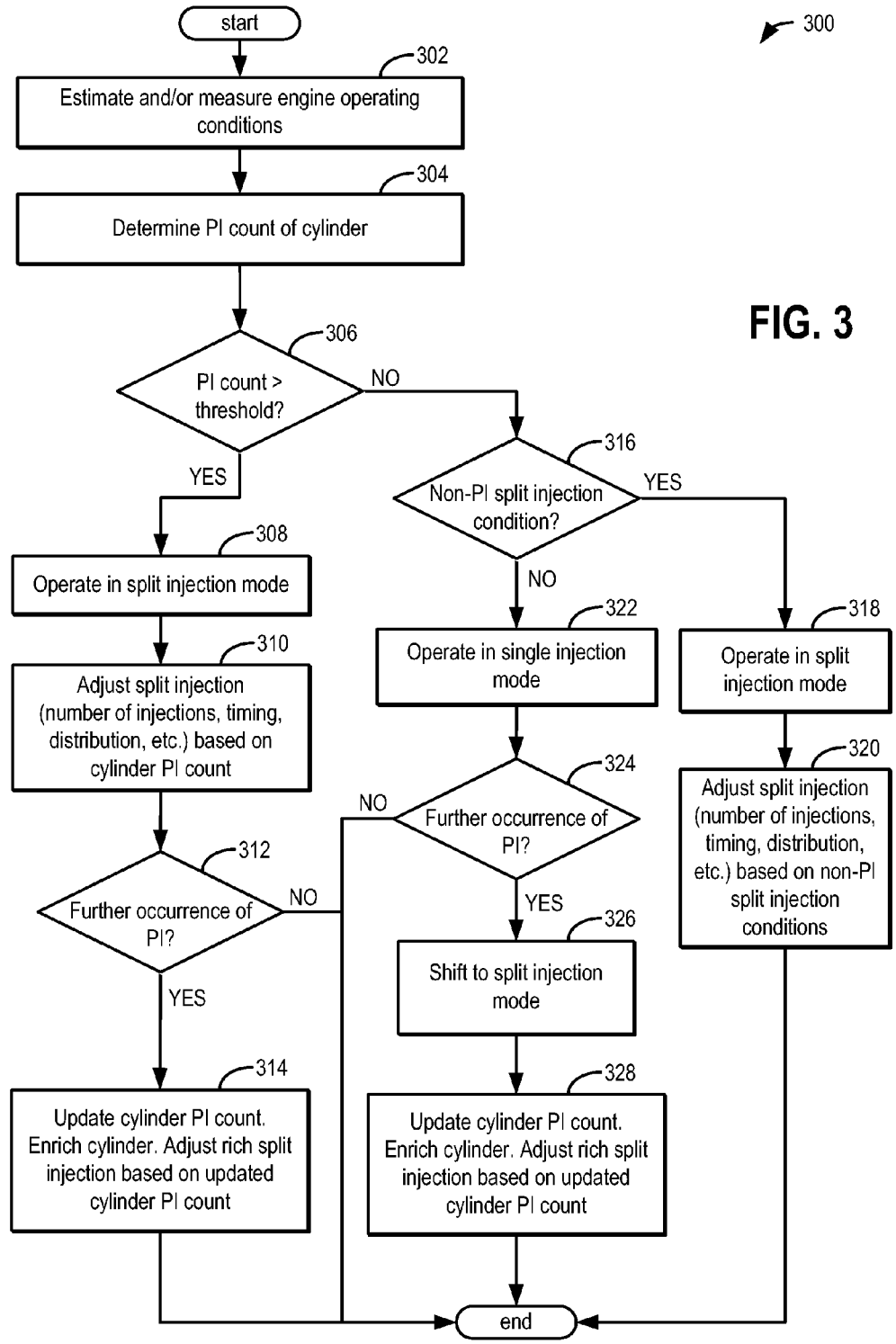
FIG. 3 shows a high level flow chart for adjusting a timing and number of injections to an engine cylinder based on a cylinder pre-ignition count.
Figure 4:
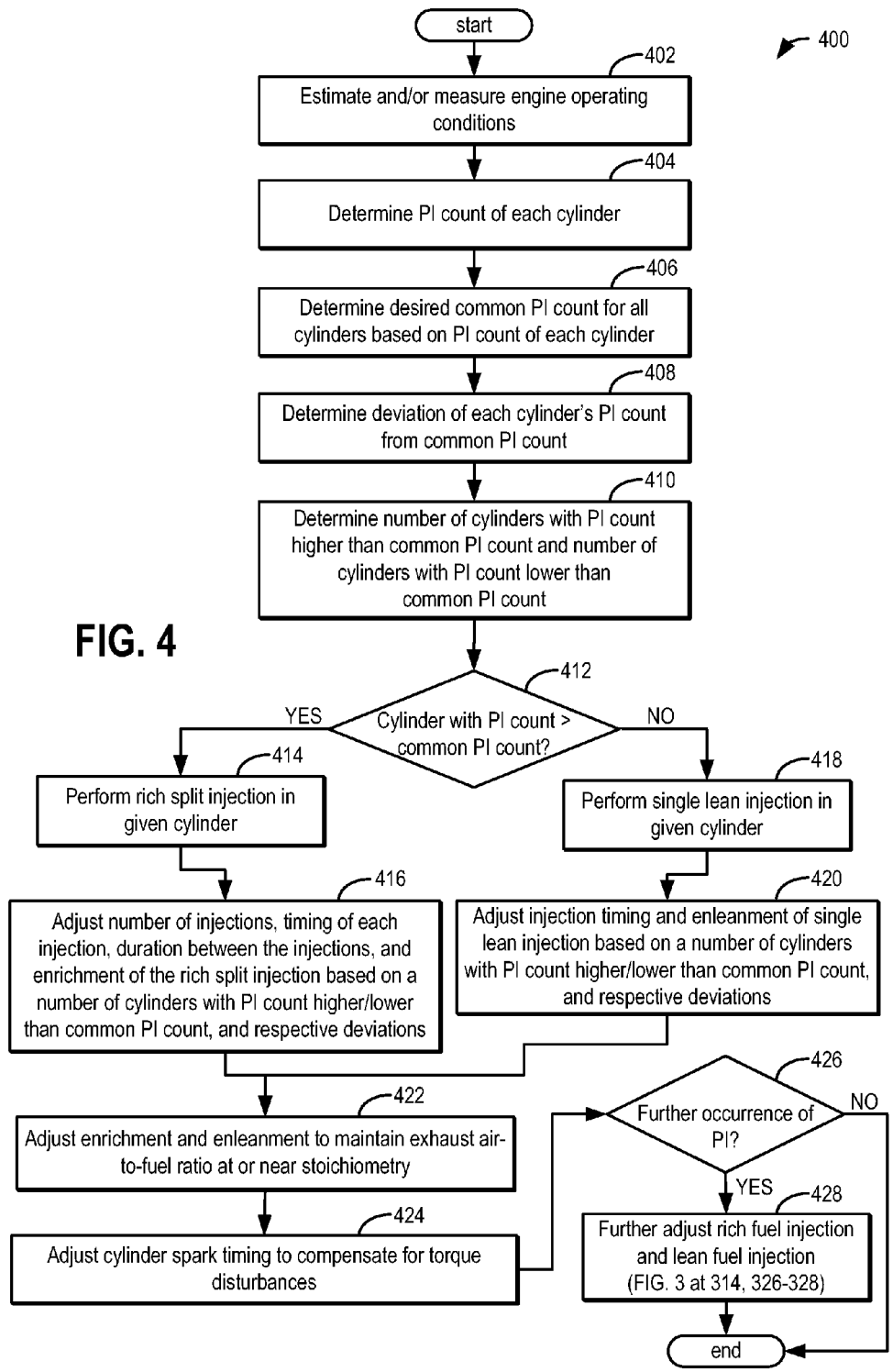
FIG. 4 shows a high level chart for balancing the occurrence of cylinder pre-ignition in an engine.

The following description relates to systems and methods for adjusting a fuel injection to each cylinder of an engine (such as the engine system of FIGS. 1-2) based on the pre-ignition count of the cylinder. An engine controller may inject fuel into some engine cylinders as a split injection, while injecting fuel into other cylinders as a single injection. The controller may perform an example routine, as shown in FIG. 3, to adjust the injection mode, as well as the timing and number of injections, based on the cylinder's pre-ignition history so as to reduce the occurrence of pre-ignition. In response to further cylinder pre-ignition, the cylinder may be enriched with the injection mode, and injection details further adjusted based on an updated cylinder pre-ignition count. The engine controller may also perform an example routine, as shown in FIG. 4, to selectively enrich cylinders with a relatively higher occurrence of pre-ignition with multiple injections in a single engine cycle, while selectively enleaning cylinders with a relatively lower occurrence of pre-ignition with a single injection in the engine cycle so as to balance the incidence of pre-ignition in all the engine cylinders. A degree of enrichment and a degree of enleanment of the cylinders may be adjusted such that the balancing is done while maintaining an exhaust air-to-fuel ratio of the engine at or around stoichiometry. The controller may also compensate for cylinder torque transients (FIG. 5) resulting from the injection adjustments using spark timing adjustments. An example fuel injection operation is illustrated herein with reference to FIG. 6. In this way, by adjusting the fueling of each cylinder of an engine based on respective pre-ignition counts, engine pre-ignition may be reduced despite differences in pre-ignition frequency in different engine cylinders.

Figure 1:
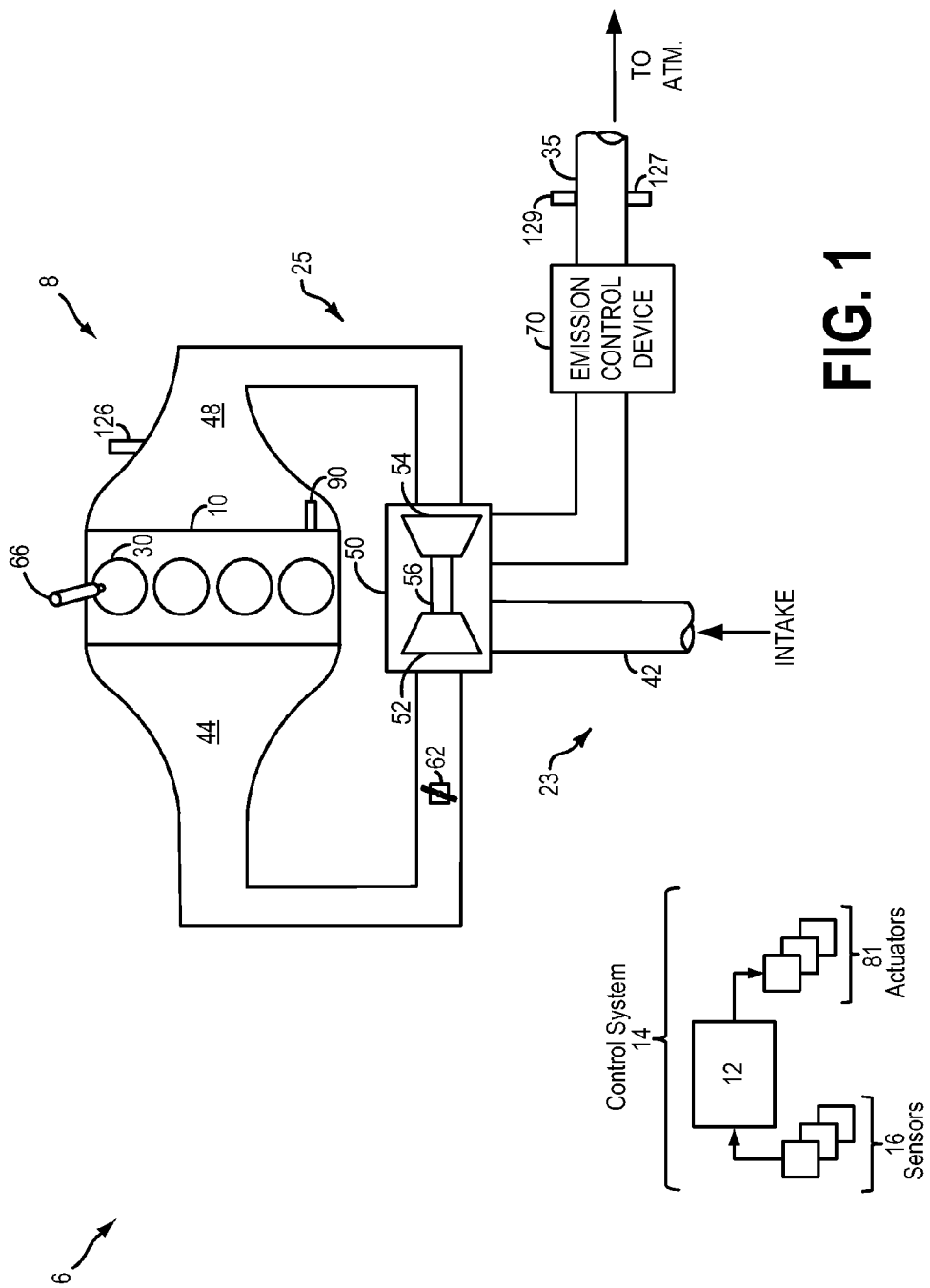
FIG. 1 shows an example engine system.

FIG. 1 shows a schematic depiction of a vehicle system 6 including an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of an after-cooler (not shown). As such, the after-cooler may be configured to reduce the temperature of the intake air compressed by the boosting device. Turbocharger 50 may include a compressor 52, arranged between intake passage 42 and intake manifold 44. Compressor 52 may be at least partially powered by exhaust turbine 54, arranged between exhaust manifold 48 and exhaust passage 35, via turbine shaft 56.

Engine exhaust 25 may include one or more emission control devices 70, which may be mounted in a close-coupled position in the exhaust. One or more emission control devices may include a three-way catalyst, lean NOx filter, SCR catalyst, PM filter, etc.

Engine system 8 may further include one (as depicted) or more knock sensors 90 distributed along engine block 11. When included, the plurality of knock sensors may be distributed symmetrically or asymmetrically along the engine block. Knock sensor 90 may be an accelerometer, or an ionization sensor.

An engine controller may be configured to detect and differentiate abnormal combustion events due to cylinder knocking from those indicative of cylinder pre-ignition based on the output (e.g., signal timing, amplitude, intensity, frequency, etc.) of the one or more knock sensors 90. In one example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. In one example, the windows in which the knock signals are estimated may be crank angle windows. The windows may be partially overlapping, or completely distinct.

Mitigating actions taken by the engine controller to address knock may also differ from those taken by the controller to address pre-ignition. For example, knock may be addressed using ignition spark timing adjustments (e.g., spark retard) and EGR, while pre-ignition may be addressed using load-limiting and fuel enrichment.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), knock sensor(s) 90, temperature sensor 127, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors 66, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with reference to FIGS. 3-4.

Figure 2:
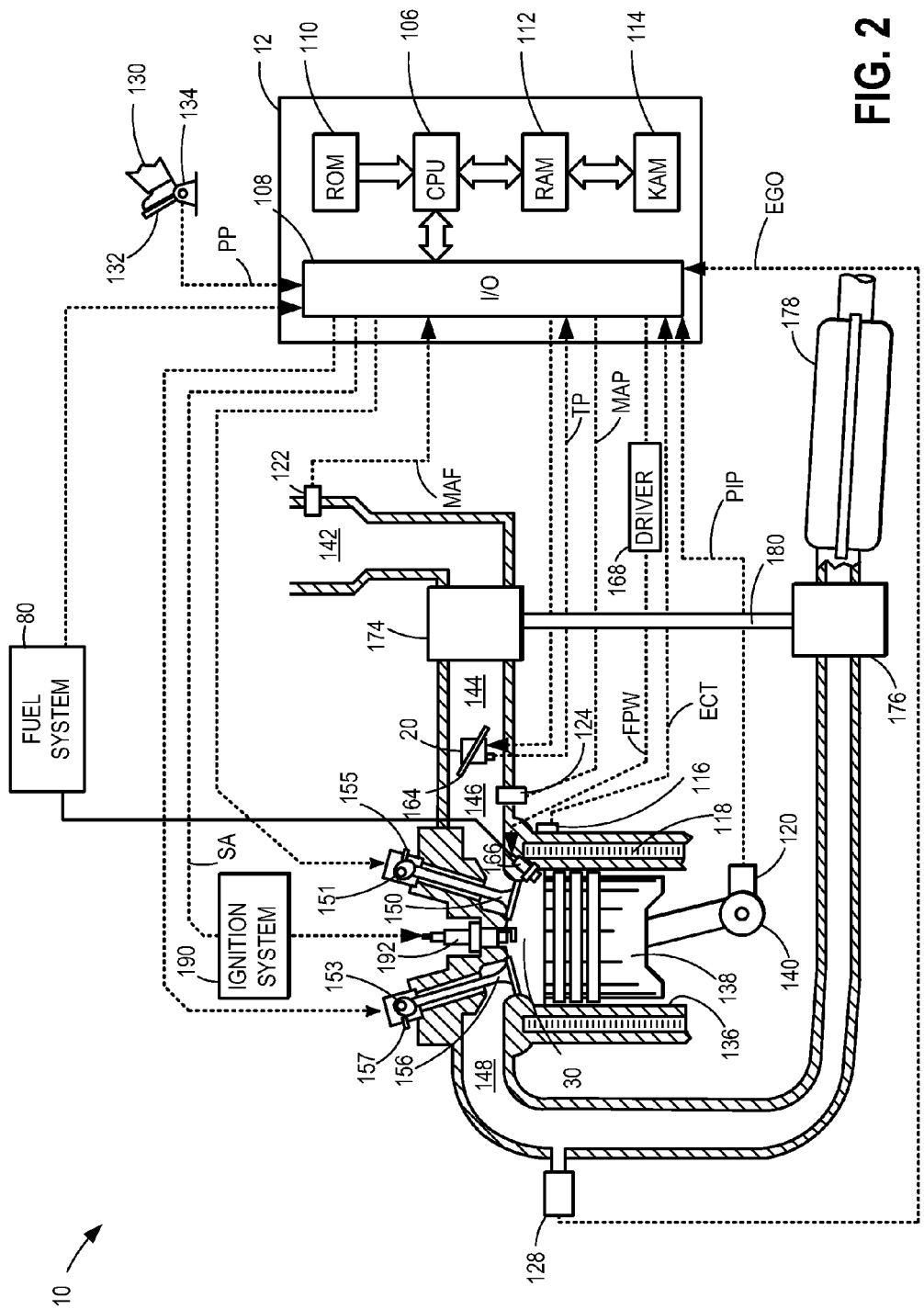
FIG. 2 shows an example combustion chamber.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 80 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 80 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Now turning to FIG. 3, an example routine 300 is described for adjusting the fueling of each cylinder of an engine based on the cylinder's pre-ignition count. Specifically, cylinders with a higher likelihood of pre-ignition may be operated in a split injection mode, with fuel delivered as multiple injections in an engine cycle, to reduce the possibility of cylinder pre-ignition. In comparison, cylinders with a lower likelihood of pre-ignition may continue to be operated in a single injection mode with fuel delivered as a single injection in the same engine cycle. By selecting a cylinder injection mode (between single injection and split injection modes) based on the pre-ignition count of the cylinder, a likelihood of cylinder pre-ignition can be reduced.

At 302, engine operating conditions are estimated and/or measured. These include, for example, engine speed and load, torque demand, boost, manifold pressure (MAP), manifold aircharge temperature (MCT), air-fuel ratio (lambda), fuel alcohol content, etc. At 304, the pre-ignition count of each cylinder may be determined. In one example, the pre-ignition count of each cylinder may be stored in a look-up table in the database of the engine controller. The look-up table may be updated at regular intervals (e.g., every engine cycle, every 50 miles, every hour, etc.), or in response to an occurrence of cylinder pre-ignition.

The pre-ignition (PI) count for each cylinder may include, for example, a cylinder trip PI count and a cylinder lifetime PI count. The cylinder trip PI count may represent a total number of pre-ignition events in the cylinder over the present trip, or engine cycle. The cylinder lifetime PI count may represent the total number of pre-ignition events in the cylinder over the lifetime of engine operation. Further, individual cylinder lifetime PI counts and trip PI counts may be used to determine an overall engine lifetime and trip PI count. As such, each cylinder's PI count may represent the given cylinder's pre-ignition history, and may correlate with each cylinder's propensity for further pre-ignition events.

Under otherwise identical engine operating conditions, the incidence of pre-ignition in different cylinders may vary due to differences in manufacturing, as well as due to differences in compression ratio, effective heat rejection, fuel injection, etc. For at least some of the same reasons, the incidence of knocking may also vary between cylinders. Cylinders with a higher occurrence of pre-ignition and knocking may degrade earlier due to higher combustion pressures experienced therein. By feed-forward adjusting the injection mode, as well as the timing (and number of injections in a single engine cycle, where applicable) of fuel injection to each cylinder of an engine based on a pre-ignition count of the cylinder, the incidence of abnormal combustion events in the cylinder may be reduced, and cylinder degradation due to pre-ignition may be curbed.

At 306, it may be determined whether the pre-ignition count of a given cylinder is higher than a threshold. If the pre-ignition count of the cylinder is higher than the threshold, then at 308, the given cylinder may be operated in a split injection mode, thereby receiving fuel as multiple injections in an engine cycle. Specifically, the cylinder may receive a split rich injection. By providing a rich fuel injection as multiple injections over an engine cycle, rather than as a single injection, the pre-ignition mitigating effect of the fuel injection may be improved and the likelihood of pre-ignition in the cylinder may be reduced.

At 310, split injection details may be determined. This includes determining a number of multiple injections, a timing and injection amount for of each of the multiple injections, as well as a split ratio of the multiple injections for the cylinder split injection based at least on the pre-ignition count of the cylinder. This further includes determining a degree of enrichment of the rich fuel injection (e.g., duration of enrichment, amount of enrichment, etc.). The timing adjustments for the split injection may include adjustments to the start of injection timing, the end of injection timing, an average injection timing, and a duration between the multiple injections. Split ratio adjustments may include adjustments to the amount of fuel that is injected in each of the multiple injections (e.g., symmetrically distributed or asymmetrically distributed) to provide the desired enrichment.

In one example, a number of multiple injections in the given engine cycle may be increased as the cylinder's pre-ignition count increases above the threshold, while adjusting the timing of each of the multiple injections such that an average injection timing is maintained the same as for a corresponding single injection. In another example, the split ratio of the multiple injections may be adjusted such that the first injection is rich while the later injections are lean or stoichiometric. Additionally or optionally, the timings of one or more of the multiple injections may be adjusted, based at least on the number of injections as well as the split ratio of the injections so that the average injection timing is retarded or advanced relative to the corresponding single injection. For example, if a smaller amount of fuel in injected in the first injection (e.g., lower than a threshold amount), the injection timing may be advanced. Herein, the small amount of fuel injected early in the engine cycle may provide cylinder cooling effects that can reduce the likelihood of abnormal combustion events. In comparison, if a larger amount of fuel is injected in the first injection (e.g., higher than the threshold amount), the injection timing may be retarded. Herein, the larger amount of fuel injected later in the engine cycle may reduce cylinder wall impingement of fuel. As such, cylinder wall impingement can cause oil droplets to come off the cylinder walls, leading to a low octane species in the combustion mixture that can turn into an ignition source.

In still further embodiments, the injection timing may be adjusted to a pre-ignition reducing injection timing, the pre-ignition reducing injection timing based on the pre-ignition count of the cylinder. For example, if the pre-ignition count of the cylinder is higher than a threshold a pre-ignition reducing injection timing, or timing window, may be determined based on the cylinder pre-ignition count. The window may correspond to a timing range within which fuel may be rich injected to reduce the likelihood of further pre-ignition. If the current injection timing (e.g., the average injection timing of the multiple injections) is advanced relative to the pre-ignition reducing injection timing, the timing of one or more of the multiple injections may be retarded to bring the injection timing within the desired timing window. In comparison, if the current injection timing is retarded relative to the pre-ignition reducing injection timing, the timing of one or more of the multiple injections may be advanced to bring the injection timing within the desired timing window. As used herein, the injection timing may be the start of injection timing, the end of injection timing, the duration of the injection, the average injection timing and/or the duration between the multiple injections. In this way, by enriching a cylinder that has a higher pre-ignition count with a split injection (that is, with multiple injections over a given engine cycle), the likelihood of pre-ignition in that cylinder can be reduced.

Further still, a proportion of fuel that is direct injected to the cylinder relative to the proportion of fuel that is port injected to the cylinder may be adjusted based on the cylinder's pre-ignition count. For example, the proportion of the split rich injection that is direct injected may be increased as the cylinder pre-ignition count increases above the threshold while the remaining portion is provided as port injection. Further still, to factor in charge cooling properties of the injected fuel, and their effect on abnormal cylinder combustion events, the timing and number of injections for the split injection may be further adjusted based on an alcohol content of the injected fuel. Likewise, if an alternate diluent is available, such as water, methanol, etc., the timing and number of injections for the split injection may be further adjusted based on the octane content of the diluent. For example, the number of injections may be increased as the alcohol content of the injected fuel, and/or the octane content of the diluent, increases. Likewise, the injection timing may be further adjusted (e.g., advanced or retarded) to take advantage of the cooling properties of the fuel and/or diluent.

In still further examples, such as a dual injection system where the diluent is available for direct injection into the cylinder, a timing, distribution, and number of injections of the diluent may also be adjusted based on the cylinder pre-ignition count. For example, diluent injection may be scheduled in a closed loop response to pre-ignition, in an open loop or feed-forward response to pre-ignition, or other adaptive fashion. This allows the diluent injection to be coordinated with the fuel injection, and synergistic charge cooling benefits to be achieved.

In one embodiment, as elaborated in FIG. 4, the adjustments may be performed on a cylinder-by-cylinder basis for each cylinder of the engine to bring a pre-ignition count of each cylinder closer to each other, for example, to a common pre-ignition count.

In this way, by adjusting the timing and number of injections to each cylinder based on the cylinder's pre-ignition count, pre-ignition mitigating factors can be used to balance and compensate for pre-ignition contributing factors. For example, air and fuel based pre-ignition mitigation and convective charge cooling effects can be used to offset cylinder wall impingement of fuel and smoke generation. Based on engine operating conditions, the injection schedule can be adjusted to trade off some attributes in order to take advantage of others to reduce an overall pre-ignition tendency of the engine.

Returning to FIG. 3, at 312, it may be confirmed whether a pre-ignition event has occurred in the cylinder. As such, even with operation in the split injection mode, cylinder pre-ignition events may occur. Thus, at 314, in response to the further occurrence of cylinder pre-ignition, the cylinder pre-ignition count of the affected cylinder may be increased and the cylinder may be further enriched for a duration, the enrichment based on the increased cylinder pre-ignition count. That is, in response to the occurrence of cylinder pre-ignition, the split injection details if the split rich injection may be adjusted based on the updated cylinder pre-ignition count.

As one example, the number of multiple injections in the split rich injection may be increased. Herein, by providing the enrichment as a larger number of injections, pre-ignition mitigation may be improved. As another example, the timing of the multiple injections in the split rich injection may be adjusted to further advance or retard the injection timing (e.g., start of injection timing, end of injection timing, average injection timing, etc.) and/or to increase a duration between the multiple injections. As yet another example, the split ratio of the injections may be adjusted to increase the enrichment of the first injection relative to the later injections (for example, by increasing the duration or amount of the first injection). Alternatively, the enrichment of each of the multiple injections may be increased. The injection distribution may also be adjusted with a larger proportion of fuel being direct injected as compared to the proportion that is port injected. In one example, substantially all of the rich fuel injection may be delivered via the direct injector. Further still, the injection of alternate higher octane fuels, and/or diluents may be adjusted (e.g., number of injection may be increased, a duration of each injection may be increased, an amount of fuel or diluent injected may be increased, etc.) to provide convective cylinder air charge cooling that may lower the pre-ignition propensity.

Returning to 306, if the likelihood of pre-ignition is lower than the threshold, then at 316, it may be determined whether any non-pre-ignition split injection condition is present. As such, a split injection mode of fuel delivery may be used even when there is no pre-ignition. As one example, during an engine cold-start condition, multiple fuel injections may be used to improve fuel evaporation in the cylinder and engine startability. The multiple fuel injections may also reduce cold-start exhaust emissions. If a non-pre-ignition split injection condition is confirmed, then at 318, the cylinder may be operated in the split injection mode. Specifically, the cylinder may receive a split stoichiometric injection. Herein, the total mass of fuel required to achieve stoichiometry (or an alternate desired air-to-fuel ratio) may remain constant, while the mass delivered between the start of injection timing (or angle) and the end of injection timing (or angle), as well as the number of injections may be changed. At 320, the split stoichiometric injection details may be determined based on engine operating conditions other than the cylinder pre-ignition count. For example, a timing, split ratio, and number of multiple injections of the split injection may be based on engine speed-load conditions, exhaust catalyst temperature conditions, a fuel alcohol content, etc. In one example, the number of injections may be increased while the split ratio of the multiple injections may be adjusted such that the each injection is stoichiometric.

If the likelihood of pre-ignition is low (at 306) and there are no other engine operating conditions warranting the use of split injections (at 316), then at 322, the cylinder may be operated in a single injection mode. Specifically, the cylinder may receive a single lean injection wherein the enleanment is delivered to the cylinder as a single injection in a given engine cycle. A timing of the injection and a degree of enleanment (e.g., amount, duration, etc.) of the single lean injection may be based on engine operating conditions and the cylinder pre-ignition count.

At 324, it may be confirmed whether cylinder pre-ignition has occurred. As such, even with a low pre-ignition likelihood, cylinder pre-ignition events may occur. Thus, in response to a cylinder pre-ignition event that occurs while the cylinder is operating with single fuel injection, at 326, cylinder operation may be shifted from the single injection mode to the split injection mode to improve the pre-ignition mitigating effect of the injected fuel. In one example, by providing the same fuel injection amount as a split injection rather than a single injection, pre-ignition may be mitigated.

If the shift to the split injection mode is not sufficient to mitigate the cylinder pre-ignition, then at 328, a pre-ignition count of the affected cylinder may be updated and the cylinder may be enriched. That is, in response to further occurrence of cylinder pre-ignition, a split rich injection may be performed in the cylinder, the split injection details adjusted based on the updated cylinder pre-ignition count (as previously elaborated at 314).

In this way, by using a split rich injection in response to a higher likelihood of cylinder pre-ignition, and using a single lean injection in response to a lower likelihood of cylinder pre-ignition, abnormal combustion events due to pre-ignition can be reduced.

Now turning to FIG. 4, an example routine 400 is shown for adjusting fuel injection to each cylinder of an engine to balance the incidence of pre-ignition among the engine cylinders.

At 402, as at 302, engine operating conditions may be estimated and/or measured. At 404, as at 304, the pre-ignition count of each cylinder may be determined. At 406, a desired common pre-ignition count for all the cylinders of the engine may be determined based on the pre-ignition count of each cylinder. In one example, the common pre-ignition count may be a weighted average of the pre-ignition count of all the cylinders of the engine. In another example, where the engine includes groups of cylinders, the common pre-ignition count may be a weighted average of the pre-ignition count of all the cylinders of the group. Alternatively, the common pre-ignition count may be an alternate statistical function (e.g., mean, mode, median, etc.) of the pre-ignition counts of all the cylinders.

At 408, a deviation of each cylinder's pre-ignition count from the common pre-ignition count may be determined. At 410, a number of cylinders with a pre-ignition count above the common pre-ignition count, and a number of cylinders with a pre-ignition count below the common pre-ignition count may be determined.

At 412, it may be confirmed whether a given cylinder has a pre-ignition count that is greater than the common pre-ignition count. If yes, then at 414, the routine includes enriching the cylinder with a split rich injection. At 416, the details of the split rich injection may be determined. Specifically, for the split rich injection, a degree of enrichment, a number of multiple injections, a timing of the injections, an amount of fuel injected in each multiple injection, a split ratio of the injections, and/or a distribution of the injections between a direct injector and a port injector may be adjusted based on a deviation of the pre-ignition count of the given cylinder from the common pre-ignition count, a number of cylinders having a cylinder count above the common pre-ignition count, a number of cylinders having a cylinder count below the common pre-ignition count, and their respective deviations from the common pre-ignition count.

For example, the timing (start of injection timing, end of injection timing, average injection timing, etc.) of the rich fuel injection may be adjusted (e.g., appropriately advanced or retarded) towards a pre-ignition reducing injection timing and/or the number of injections in the split rich fuel injection may be increased as the deviation of the cylinder's pre-ignition count from the common pre-ignition count increases, and a number of cylinders with a cylinder pre-ignition count lower than the common pre-ignition count increases. The desired enrichment may be distributed symmetrically or asymmetrically between the multiple injections. As one example, the split ratio may be adjusted such that a first injection is more rich while the later injections are less rich (for example, lean or stoichiometric). In an alternate example, each injection may be slightly (and equally) rich.

In comparison, if at 412 it is determined that the given cylinder has a pre-ignition count that is lower than the common pre-ignition count, then at 418, the routine includes enleaning the cylinder with a single lean injection. At 420, the details of the single lean injection may be determined. Specifically, for the single lean injection, a degree of enleanment, an injection timing, a fuel injection amount, and/or a distribution of the injection between a direct injector and a port injector may be adjusted based on a deviation of the pre-ignition count of the given cylinder from the common pre-ignition count, a number of cylinders having a cylinder count above the common pre-ignition count, a number of cylinders having a cylinder count below the common pre-ignition count, and their respective deviations from the common pre-ignition count.

As such, at 416 and at 420, the timing and number of injections of the split rich fuel injection (at 416) and the timing of the single lean fuel injection (at 420) may be further adjusted based on an alcohol content of the injected fuel. By adjusting the split rich fuel injection and the single lean fuel injection based on the deviation of each cylinder's pre-ignition count from the common pre-ignition count, a rich fuel injection to a first cylinder and a lean fuel injection to a second cylinder may be adjusted to bring their respective pre-ignition counts closer to each other.

At 422, the degree of enrichment of the rich fuel injection and the degree of enleanment of the lean fuel injection to the cylinders may be further adjusted to maintain an exhaust air-to-fuel ratio of the engine at or near stoichiometry. As such, typical pre-ignition mitigating fuel adjustments include cylinder enrichment or enleanment, with corresponding exhaust enrichment or enleanment. Herein, the inventors have realized that by selecting (e.g., prior to any cylinder fuel adjustment) a common pre-ignition count for all cylinders of an engine based on the number of cylinders as well as their respective pre-ignition counts, and then adjusting fuel injection to each cylinder to bring each cylinder to the preselected common pre-ignition count, rich fuel injections in some engine cylinders may be offset by lean fuel injections in other cylinders of the engine. For example, the degree of enrichment and enleanment not only obtains the desired common pre-ignition count in each cylinder, but also the mixture air-fuel ratio of those cylinders achieves a desired air-fuel ratio. Thus, cylinder fuel enrichment with a split rich injection responsive to a high frequency of pre-ignition in one cylinder may be offset by a cylinder fuel enleanment with a single lean injection that raises the frequency of pre-ignition in another cylinder (or cylinders). At the same time, by providing the cylinder fuel enrichment in multiple injections, the pre-ignition mitigating action of the enrichment can be further improved. In this way, each cylinder is brought to a common incidence of pre-ignition to reduce the risk of degradation in cylinders with high pre-ignition occurrence. At the same time, a degree and number of cylinder enrichments is counterbalanced by a degree and number of cylinder enleanments to maintain the exhaust air to fuel ratio of the mixture of the cylinders at stoichiometry. Consequently, overall engine performance is improved.

Figure 5:
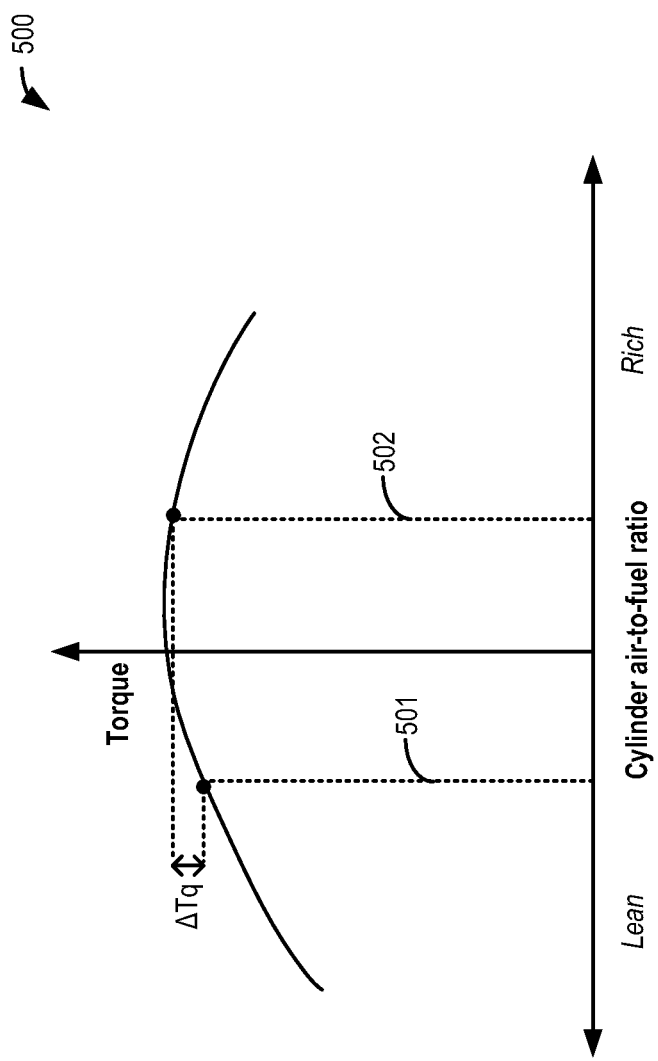
FIG. 5 shows example changes in cylinder torque in response to adjustments in cylinder fueling.

At 424, cylinder torque disturbances arising (or anticipated) from the cylinder fuel balancing adjustments may be compensated for by adjusting a cylinder spark timing. Specifically, the routine may include adjusting an ignition spark timing of at least one cylinder based on a cylinder torque difference between the cylinders. With reference to FIG. 5, it shows a map 500 of an example change in cylinder torque responsive to a change in a cylinder's air-to-fuel ratio (as may arise due to a change in the cylinder's fuel injection). In the depicted example, a relatively larger change (e.g., decrease) in torque may be seen for a first cylinder 501 that is enleaned by an amount, while a relatively smaller change (e.g., increase) in torque may be seen for a second cylinder 502 that is enriched by the same amount. As such, the engine controller may be configured to compute a torque difference between the cylinders ($\Delta Tq$) and compare the difference to a predetermined torque threshold. If the torque difference between the cylinders is larger than the threshold, the vehicle operator may feel the torque transient which may degrade the operator's drive experience. Thus, to compensate for this torque transient and to reduce the degraded drive feel experienced by the operator, the controller may adjust a spark timing of the second cylinder 502, for example, by increasing an amount of cylinder spark retard, to reduce the cylinder's torque, thereby reducing the torque difference between the cylinders. As such, this may (temporarily) reduce the engine torque by a small amount, however, this may be accepted to improve the driver's drive feel. An example cylinder spark timing adjustment is elaborated herein with reference to the example of FIG. 6.

At 426, further occurrences of pre-ignition may be determined. If no further pre-ignition occurs, the routine may end. If further pre-ignition does occur, then at 428, the rich and lean fuel injections may be further adjusted in response to the occurrence of pre-ignition (as previously elaborated with reference to FIG. 3). For example, the enrichment of the split rich injection may be increased by increasing the amount of fuel injected, increasing the duration of fuel injected, increasing the number of injections, adjusting the split ratio (e.g., with more fuel injected in the first injection relative to later injections), and/or adjusting a distribution of the multiple injections (e.g., with more fuel direct injected relative to fuel that is port injected) to improve the pre-ignition mitigating enrichment.

While the depicted embodiment of routine 400 illustrates adjusting the fueling of each cylinder of the engine based on cylinder pre-ignition counts, it will be appreciated that in alternate embodiments, the fueling may be further adjusted based on a knock rate (that is, incidence of cylinder knock) of each cylinder to additionally bring the knock rate of each cylinder to a common (average) knock rate. Also, while the depicted embodiment illustrates cylinder fueling adjustments based on the pre-ignition count of each cylinder of an engine (i.e., engine-specific basis), in alternate embodiments where the engine includes distinct groups of cylinders, the routine may include comparing pre-ignition counts of each cylinder in a given group of cylinders (i.e., group-specific basis), and based on the comparison, adjusting an amount of fuel delivered to each cylinder in a given group of cylinders to bring the pre-ignition counts of each cylinder in that group closer to each other, while maintaining an exhaust air-to-fuel ratio of the given group of cylinders at or near stoichiometry. That is, the pre-ignition of each group of cylinders may be balanced independent of the other groups.

In another example, the engine may include a first group of cylinders and a second group of cylinders, and the engine controller may be configured to perform the cylinder pre-ignition balancing fuel adjustment for one group of cylinders but not the other. Likewise, the engine controller may be configured to enable split injection on one or more cylinders of the first group of cylinders but not the other. For example, the first group of cylinders may have a higher average pre-ignition count than the second group of cylinders. Alternatively, the first group of cylinders may have a cylinder having the highest pre-ignition count of all the cylinders of the engine. During such conditions, the engine controller may be configured to adjust the fueling of all cylinders of the first group only (and not of the second group of cylinders), to balance the incidence of pre-ignition in the first group only.

In still further examples, such as in engine systems configured to operate with one or more types of fuel, the fueling of each cylinder may be further adjusted based on a fuel type of the fuel injected into the cylinder. For example, where the injected fuel is an alcohol fuel (e.g., an ethanol-gasoline blend), the fueling may be adjusted based on an alcohol content (or octane content) of the injected fuel. Likewise, in engine systems configured to direct inject a diluent (such as water, methanol, or a combination thereof), the fueling of each cylinder may be further adjusted based on an octane content of the injected diluent. The adjustment may include adjusting the amount of fuel delivered to each cylinder, and/or the number of injections in which the amount of fuel is delivered based on the alcohol content of the injected fuel and/or the octane content of the injected diluent. Additionally, the common pre-ignition count desired for the cylinders may be adjusted based on the alcohol content (or octane content) of the injected fuel or diluent. For example, the adjustment may include fueling each cylinder to bring the pre-ignition count of each cylinder to a lower common pre-ignition count as the alcohol content of the injected fuel (or octane content of the injected diluent) increases.

In this way, by fueling each cylinder of an engine based on a pre-ignition count of each cylinder of the engine, all the cylinders can be brought to a common pre-ignition count while maintaining the exhaust air-to-fuel ratio substantially at stoichiometry. Additionally, by balancing pre-ignition in all the cylinders, a high occurrence of pre-ignition in any given cylinder can be reduced.

Figure 6:
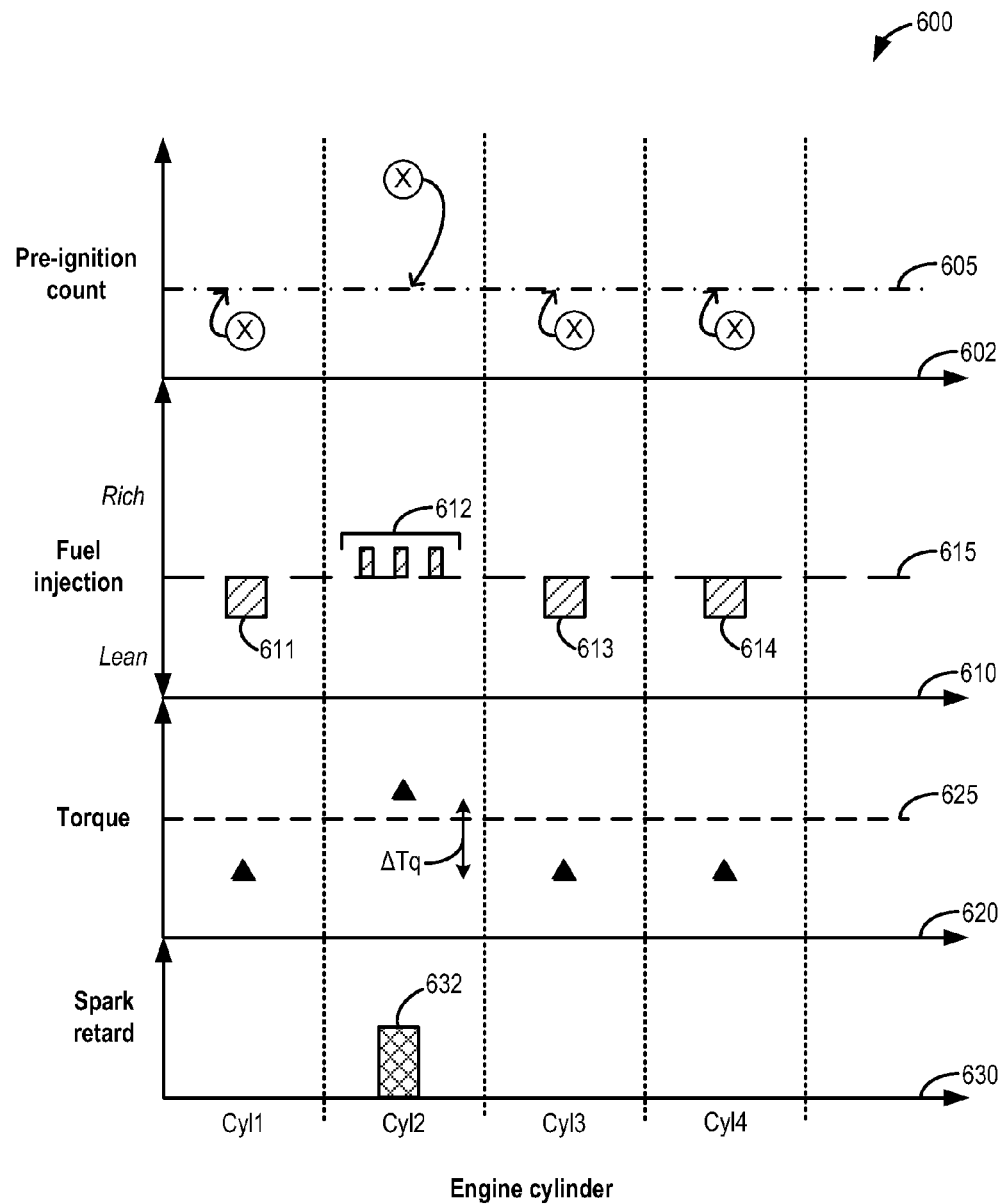
FIG. 6 shows an example fuel injection operation, according to the present disclosure.

Example cylinder fuel adjustments that may be used to bring cylinder pre-ignition counts closer to each other are now described with reference to FIG. 6 which includes example map 600 that graphically illustrates cylinder pre-ignition balancing fuel injection adjustments, as per the routine of FIG. 4, as well as cylinder split injection adjustments, as per the routine of FIG. 3.

Turning to map 600, individual cylinders of an engine system are plotted along the x-axis (herein four, cylinders 1-4, listed as Cyl1-Cyl4). In one example, the engine system may be a boosted engine including a turbocharger configured to provide a boosted intake aircharge to the engine. While the depicted map illustrates cylinders 1-4, it will be appreciated that the cylinder numbers are merely used to reflect a first, second, third and fourth cylinder of the engine and do not necessarily represent either the actual cylinder numbers, or their firing order. The pre-ignition counts for the respective cylinders is illustrated at graph 602, individual cylinder fuel injection adjustments are illustrated at graph 610, individual cylinder torque changes responsive to the cylinder fueling adjustments are plotted on graph 620, and spark timing adjustments used to compensate for the torque changes are plotted on graph 630.

Turning to graph 602, individual cylinder pre-ignition counts (each portrayed as an X), are depicted before cylinder fuel balancing adjustments. As shown, cylinder 2 has a relatively higher pre-ignition count, while cylinders 1, 3, and 4 have relatively lower, and substantially similar, pre-ignition counts. Based on the pre-ignition counts of each cylinder, a controller may select a common pre-ignition count 605. In the depicted example, the common pre-ignition count is a weighted average of the pre-ignition counts of the four cylinders. In alternate embodiments, the common pre-ignition count may be further adjusted based on an alcohol content of the available fuel (that will be injected). Further, the common pre-ignition count may be adjusted based on a knock rate of the cylinders to additionally balance the incidence of knock among the cylinders.

The controller may then determine a deviation of each cylinder's pre-ignition count from the common pre-ignition count (or weighted average). Herein, the deviations for each cylinder are portrayed by respective arrows. In the depicted example, the pre-ignition count deviation (from the common pre-ignition count 605) for each of the first, third and fourth cylinders is smaller than the deviation for the second cylinder.

Based on the deviations from the pre-selected common pre-ignition count 605, each cylinder is fueled to bring the pre-ignition count of each cylinder closer to the weighted average (that is, to common pre-ignition count 605). Specifically, the cylinder with a pre-ignition count higher than the weighted average (herein, cylinder 2) is enriched, while the cylinders with a pre-ignition count lower than the weighted average (herein, cylinders 1, 3, and 4) are enleaned. Additionally, to improve the pre-ignition mitigating effect of the enrichment, the rich injection to cylinder 2 may be provided as a split injection delivered over multiple injections. The degree of enrichment of cylinder 2 and the number of injections of the split rich injection, as well as the degree of enleanment of cylinders 1, 3, and 4, is based on the number of cylinders with a pre-ignition count higher than the weighted average (herein, one), and the number of cylinders with a pre-ignition count lower than the weighted average (herein, three). In the depicted example, the rich fuel injection to cylinder 2 is delivered as three injections, each of substantially equal amount, each spaced from the next injection by a substantially equal duration. Further, the injection timings of the three injections may be adjusted such that an average injection timing is maintained at a timing that may be used for a single rich injection equivalent of the multiple injections.

Herein, since there are 3 cylinders with a pre-ignition count that is below the weighted average and only a single cylinder with a pre-ignition count that is above the weighted average, the degree of enrichment 612 (herein, the sum of the amount of fuel injected over the three injections) for cylinder 2 may be larger than the degree of enrichment for each of cylinders 1, 3, and 4 (herein, 611, 613, and 614, respectively). Further, since the pre-ignition counts of cylinders 1, 3, and 4 are substantially the same, the degree of enleanment of each of cylinders 1, 3, and 4 is $\frac{1}{3}^{rd}$ (in amplitude) of the degree of enrichment 612 of cylinder 2. Further, a sum of the enleanment of the cylinders is adjusted to be equal to the sum of the enrichment of the other cylinders. In the depicted example, the sum of the lean fuel injection (611, 613, 614) for cylinders 1, 3, and 4 is equal to the sum of the three split injections (612) for cylinder 2. Thus, the enrichment 612 of cylinder 2 is adjusted to offset the enleanment 611, 613, 614 of cylinders 1, 3, and 4 to maintain a net engine exhaust air-to-fuel ratio at stoichiometry (represented by dashed line 615).

It will be appreciated that while the depicted example illustrates the concept of cylinder pre-ignition balancing with four cylinders, this is not meant to be limiting, and that in alternate examples, a larger or smaller number of cylinders may have their pre-ignition counts above or below the common pre-ignition count, and further, the pre-ignition count of each cylinder may substantially vary. Therein, the degree of enrichment, the number of injections of the split rich injection, and the degree of enleanment for each cylinder may be adjusted based on each cylinder's deviation from the common pre-ignition count such that a sum of the fuel injected into each cylinder having a pre-ignition count lower than the common pre-ignition count may equal a sum of the fuel injected into each cylinder having a pre-ignition count higher than the common pre-ignition count, thereby maintaining the net engine exhaust air-to-fuel ratio substantially at stoichiometry.

For example, a boosted engine may include a first cylinder with a first, higher pre-ignition count, and a second cylinder with a second, lower pre-ignition count, and a third cylinder with a third pre-ignition count, lower that the first pre-ignition count. Herein, the engine controller may compare the first, second, and third pre-ignition counts, and select a common pre-ignition count based on the comparison. Then, the controller may inject fuel (for example, direct inject fuel via a direct fuel injector) into the first cylinder to enrich the first cylinder by a first amount, inject fuel into the second cylinder to enlean the second cylinder by a second amount, and inject fuel into the third cylinder to enlean the third cylinder by a third amount. Herein, the first, second, and third amounts may be based on a deviation of the first, second, and third pre-ignition counts from the common pre-ignition count, and may be adjusted to maintain the exhaust air-to-fuel ratio of the engine at or near stoichiometry. Specifically, based on the (greater) number of cylinders having a pre-ignition count below the common pre-ignition count and based on the (smaller) number of cylinders having a pre-ignition count above the common pre-ignition count, each of the second and third amounts of fuel injected into the second and third cylinders, respectively, may be adjusted to be smaller than the first amount injected into the first cylinder. Additionally, the sum of the first amount may equal the sum of the second and third amount. Further, the second and third amounts of fuel may be delivered to the second and third cylinders, respectively, via single injections while the first amount is delivered to the first cylinder via at least two injections. The timing of the split injections, their duration, as well as the split ratio of the injections may be determined based on the deviation of the first pre-ignition count from the common pre-ignition count. Likewise, the timing of the single injection to the second cylinder may be based on the deviation of the second pre-ignition count from the common pre-ignition count while the timing of the single injection to the third cylinder may be based on the deviation of the second pre-ignition count from the common pre-ignition count.

Returning to FIG. 6, based on the individual cylinder fuel adjustments, individual torque changes, represented by triangles on graph 620, may occur. That is, torque for individual cylinders following fuel balancing adjustments may change from the common (desired) cylinder torque 625 (dashed line) before the fuel adjustment. In one example, a map, such as map 500 of FIG. 5, may be used to determine individual cylinder torque transients. The individual cylinder torque disturbances may lead to a torque difference (ΔTq) between the cylinders that were enleaned and the cylinders that were enriched. As such, if the torque difference is higher than a predetermined threshold, the torque transient may be felt by the vehicle operator and the quality of his driving experience may be reduced. Thus, in the depicted example, in response to the torque difference ΔTq between the torque of cylinder 2 and the average torque of cylinders 1, 3, and 4 being larger than a threshold, an amount of spark retard 632 for cylinder 2 may be increased (that is, an average ignition timing of the split rich injection may be retarded further away from MBT). This may reduce the torque in cylinder 2, bringing it closer to the desired cylinder torque 625, and reducing the torque difference between the cylinders. As such, this may temporarily reduce the engine torque, however, the torque transient felt by the vehicle operator may be reduced, thereby improving his drive experience.

In this way, the present disclosure reduced cylinder pre-ignition by adjusting fueling of each cylinder based on differences in each cylinder's pre-ignition propensity. Specifically, by enriching a cylinder with a higher pre-ignition propensity using multiple injections, while enleaning a cylinder with a lower pre-ignition propensity using a single injection, the pre-ignition mitigating action of the fuel injection can be improved. Additionally, cylinder-to-cylinder imbalances in pre-ignition incidence can be addressed. Overall, a high occurrence of pre-ignition in any particular cylinder can be reduced, thereby reducing engine degradation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising,
an engine including a first cylinder with a first, higher pre-ignition count and a second cylinder with a second, lower pre-ignition count;
a direct fuel injector configured to direct inject fuel into the first and/or the second cylinder; and
a controller with computer readable instructions for,
operating the first cylinder in a split injection mode to rich inject fuel directly in the first cylinder; and
operating the second cylinder in a single injection mode to lean inject fuel directly in the second cylinder.

2. The system of claim 1, wherein a timing and number of injections of the rich fuel injection is based on the first pre-ignition count, and wherein a timing of the lean fuel injection is based on the second pre-ignition count.

3. The system of claim 2, wherein the timing of the rich fuel injection is adjusted into a pre-ignition reducing injection timing and the number of injections of the rich fuel injection is increased as the first pre-ignition count increases above a threshold, the pre-ignition reducing injection timing based on the first pre-ignition count.

4. The system of claim 2, wherein the direct injector is further configured to direct inject a diluent into the first and/or second cylinder, and wherein the timing and number of injections of the rich fuel injection and the timing of the lean fuel injection is further adjusted based on an alcohol content of the injected fuel and an octane content of the injected diluent.

5. The system of claim 1, wherein the rich fuel injection to the first cylinder and the lean fuel injection to the second cylinder are adjusted to bring the first and second pre-ignition counts closer to each other while maintaining an exhaust air-to-fuel ratio of the engine at or near stoichiometry.

6. A method of operating an engine, comprising,
adjusting a timing and number of injections of a fuel injection to an engine cylinder, in a single engine cycle, based on a pre-ignition count of the cylinder, including providing a split rich injection in cylinders based on the pre-ignition count.

7. The method of claim 6, wherein the adjustment is performed on a cylinder-by-cylinder basis for each cylinder of the engine to bring a pre-ignition count of each cylinder to a common pre-ignition count.

8. The method of claim 6, further comprising, in response to an occurrence of cylinder pre-ignition, increasing the cylinder pre-ignition count and enriching the cylinder for a duration, the enrichment based on the increased cylinder pre-ignition count.

9. The method of claim 6, wherein the adjustment includes,
adjusting the timing into a pre-ignition reducing injection timing, the pre-ignition reducing injection timing based on the pre-ignition count of the cylinder; and
increasing the number of injections in the same engine cycle as the cylinder pre-ignition count increases above a threshold.

10. The method of claim 9, wherein the timing and number of injections are further adjusted based on an alcohol content of the injected fuel and/or an octane content of a diluent.

11. The method of claim 6, wherein a portion of the fuel injection to the cylinder is direct injected and a remaining portion is port injected, a ratio of direct injected fuel relative to port injected fuel based on the cylinder pre-ignition count.

12. The method of claim 11, wherein the portion of fuel injection that is direct injected is increased as the cylinder pre-ignition count increases above a threshold.

13. A method of operating an engine, comprising:
injecting fuel in an engine cycle via split fuel injection to enrich a first cylinder with a first, higher pre-ignition count, a timing and number of injections of the fuel injection based on the first pre-ignition count; and
injecting fuel in a same engine cycle to enlean a second cylinder with a second, lower pre-ignition count, a timing and number of injections of the fuel injection based on the second pre-ignition count.

14. The method of claim 13, wherein the injecting fuel to the first cylinder includes direct fuel injection.

15. The method of claim 13, wherein the fuel injection to the first cylinder and the fuel injection to the second cylinder are adjusted to bring the first and second pre-ignition counts to a common pre-ignition count while maintaining an exhaust air-to-fuel ratio at or around stoichiometry.

16. The method of claim 13, wherein the number of injections of the fuel injection to the first cylinder is increased as the first pre-ignition count increases above a threshold, and wherein the timing of the fuel injection is adjusted towards a pre-ignition reducing injection timing as the first pre-ignition count increases above the threshold, the pre-ignition reducing injection timing based on the first pre-ignition count.

17. The method of claim 13, wherein the timing and number of injections of the fuel injections to the first and second cylinders are further adjusted based on an alcohol content of the injected fuel.

18. The method of claim 13, wherein injecting fuel in the first cylinder includes direct injecting the fuel.

* * * * *